United States Patent [19]

DiGiacomo et al.

[11] Patent Number: 4,850,943

[45] Date of Patent: Jul. 25, 1989

[54] TOOTHED BELTS

[75] Inventors: Tommaso DiGiacomo, Chieti; Carlo Fiordaliso, Pescara, both of Italy

[73] Assignee: Pirelli Transmissioni Industriali S.p.A., Milan, Italy

[21] Appl. No.: 250,095

[22] Filed: Sep. 28, 1988

[30] Foreign Application Priority Data

Sep. 28, 1987 [IT] Italy ............................... 22051 A/87

[51] Int. Cl.⁴ ............................................... F16G 1/10
[52] U.S. Cl. ...................... 474/205; 428/57; 474/268
[58] Field of Search ............... 474/204, 205, 153, 253, 474/254, 266–268; 156/137–142; 428/36, 57, 58

[56] References Cited

U.S. PATENT DOCUMENTS

| | | | |
|---|---|---|---|
| 2,988,925 | 6/1961 | Sauer | 474/205 |
| 4,634,410 | 1/1987 | Tangorra et al. | 474/205 X |
| 4,695,269 | 9/1987 | Tassone et al. | 474/268 |
| 4,737,138 | 4/1988 | Komai et al. | 474/254 X |

*Primary Examiner*—Thuy M. Bui
*Attorney, Agent, or Firm*—Stevens, Davis, Miller & Mosher

[57] ABSTRACT

A toothed belt is provided which is made of an elastomeric material or the like and which comprises a plurality of teeth, alternating with spaces, covered with at least one layer of textile material. The elastomeric material forming the top of at least one tooth and the relative covering textile material layer are shaped to define at least one depression limited by two lateral protuberances. The seam joining the textile layer end portions is situated along the depression so that no rubbing can take place between the seam and a surface external to the belt. Preferably, the depression botton is formed to have a curvilinear shape and the ratio between the thickness "s" of the covering textile material layer and the bending radius "r" of the depression bottom ranges between 0.1 and 10.0.

20 Claims, 2 Drawing Sheets

TOOTHED BELTS

FIELD OF THE INVENTION

The present invention is directed to improvements in toothed belts made of elastomeric material or the like, and more specifically, the invention provides improvements intended to ensure, in course of time, the reliability of the seaming area in the covering of the belt teeth.

BACKGROUND OF THE INVENTION

As is known, a toothed belt of elastomeric material comprises a plurality of inextensible longitudinal inserts, a plurality of teeth, alternating with spaces, cantilevered from at least one face of the belt, and a covering of textile material formed by at least one layer of rubberized fabric applied on the spaces and on the teeth.

The two end portions of the fabric are butt-joined by a seam or are mutually superimposed along a small portion of the end portion. The fabric, inter alia, functions to increase the resistance of the tooth which is made of an elastomeric material deformable per se.

In practice, the tooth can be seen as a bracket fixed at one end, having a surface of maximum extension which has transverse stresses acting thereon. According to this analogy, the fixed tooth portion corresponds to the base region nearest the elastomeric material embedding the inextensible inserts oriented longitudinally of the belt, and the load surface corresponds to one of the sides on which act the transverse thrusts transmitted from one of the sides of the pulley groove.

The fabric cooperates with the elastomeric material constituting the tooth and withstands the tooth deformations. Consequently, by appropriately selecting the threads forming the fabric, the driving force of the teeth can be considerably increased with respect to that of a toothing devoid of a covering.

Unfortunately, the seaming area of the fabric represents a weak point in the resistant structure of the tooth. In fact, the seaming area, usually positioned on the sides of the tooth or on its top, is subjected to cyclic rubbing when the tooth engages with and disengages from the pulley groove, with corresponding pressures which may become high, and with a consequent tendency of the end portions of the fabric to undergo undue detachments.

As it can be understood, the enlargement of the seaming area, at first reduced and then progressively increasing, would compromise critically the overall rigidity of the tooth resistant structure and would impair the possibility of transmitting the desired driving force. Further, any detachment between the end portions of the fabric, even if small, would decrease the belt service life, allowing the immediate penetration of substances, e.g. water, able to attack and/or in some way damage the belt inserts.

In general, it is also to be taken into account that in some cases the belt seaming area tends to collapse not only in the above-indicated transitory steps of engagement and disengagement, but also in the longer phases during which one tooth is engaged in the pulley groove for the whole arc traversed during winding of the belt around the pulley.

The reasons why the fabric seaming area in loaded condition would tend to collapse might be explained as follows. Under load, a belt tooth can be schematically represented as a resistant structure defined by a "three-hinge" arc, the first hinge being situated along the central axis of the belt base; the most distant hinge is then connected to those nearest the base by two rods, one of which, being subjected to the transverse load transmitted by the side of the pulley groove, will be placed under compression. When the belt is moved in a sense opposite to the preceding one, the rod, which was subjected to compression, will be instead subjected to tension.

The elastomeric material applied on the profile of the belt tooth, on one of its sides, will behave always as one of the above-indicated rods and therefore will be subjected to a tension state and to a compression state, respectively, depending on whether it is situated at the zone nearest the point of application of the thrust imparted by the side of the pulley groove or at the opposite zone.

It is evident that the seaming area of the fabric applied on either side of the belt is compelled to follow the stresses exerted on the elastomeric material, and since these are tension stresses in either sense of motion of the belt, a continuous tendency of the fabric end portions to move away from each other will exist.

Unfortunately, the demand for higher and higher driving forces increases the forces causing the enlargement of the seaming area of the fabric, with corresponding greater risks of opening of the seam and a consequently reduced service life of the belt.

SUMMARY OF THE INVENTION

An object of the present invention is to provide a toothed belt of elastomeric material which is devoid of all of the above-cited disadvantages.

Accordingly, the present invention provides a toothed belt of elastomeric material or the like delimited by two faces, the belt comprising a plurality of inextensible inserts arranged side-by-side along a plane preestablished between the two faces, a plurality of teeth, alternating with spaces, cantilevered from at least one of said faces, each of the teeth being limited by two sides, by a top and by two arcs radiused between the sides and the base of the tooth on said face, the teeth and the spaces being covered with at least one layer of textile material whose end portions are joined together, the belt being characterized in that in at least one tooth, the elastomeric material of the tooth top and at least said layer of fabric are shaped to define at least one depression, laterally limited by protuberances, having external surfaces following the teeth contour, the seam of the end portions of the fabric layer being situated along said depression, thus excluding any rubbing contact between the seam on the tooth top and a surface external to the belt, the seam being protected against the forces acting from the outside on the belt sides due to the deformation by flexion of each protuberance, to which corresponds a state of compression along the depression profile.

BRIEF DESCRIPTION OF THE DRAWINGS

The present invention will be better understood from the following detailed description made merely by way of example and therefore not restrictive, and with reference to the accompanying drawings in which.

DETAILED DESCRIPTION OF THE INVENTION

Figure 1:
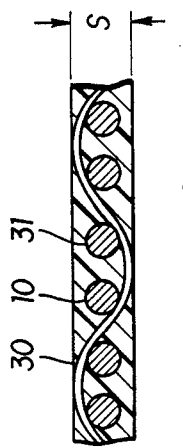
FIG. 1 is a longitudinal view of a transmission system comprising a toothed belt, and an enlarged view of a tooth in a pulley groove.

In FIG. 1 reference numeral 1 represents a synchronous transmission which comprises a toothed belt 2 of elastomeric material, limited by two faces 3 and 4, and two toothed pulleys, which are respectively a driving pulley 5 and a driven pulley 6.

Toothed belt 2 comprises a plurality of inextensible resistant inserts 7 in the form of cords of aramide fiber, glass fiber, or an equivalent material, and a plurality of teeth 8 cantilevered from face 3, alternating with spaces 9. Teeth 8 and spaces 9 are covered with a covering 10 of textile material.

A substantial feature of the invention lies in the fact that, in at least one of the teeth, the elastomeric material of the tooth top and the fabric applied on said zone are shaped so as to form a depression 11, along the profile of which extends the seam of the covering end portions.

In the embodiment of FIG. 1, the seam is positioned at point 12 on one side of the depression.

Figure 2:
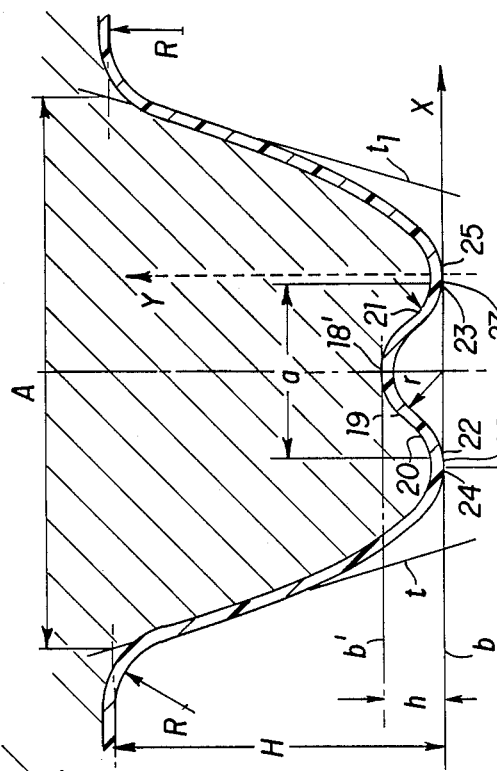
FIGS. 2 and 3 illustrate various embodiments of the invention.
Figure 3:
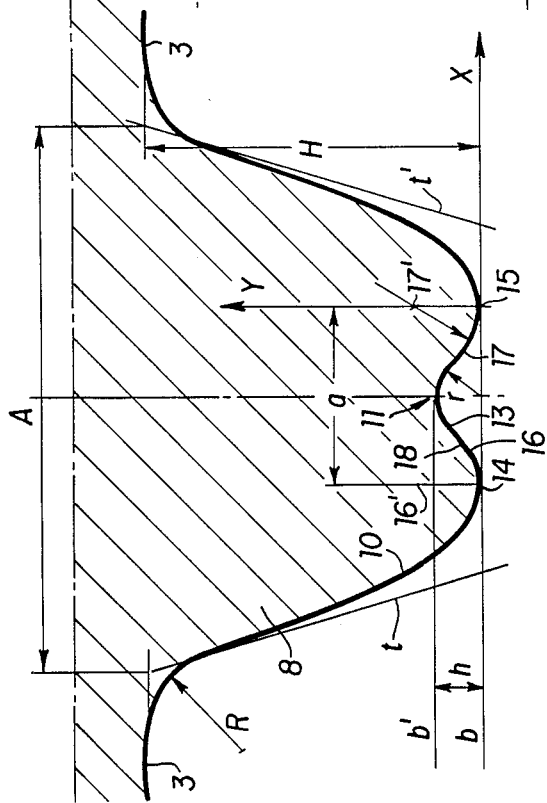

FIGS. 2 and 3 illustrate further embodiments of the primary feature of the invention relating to depression 11 and the position of the seam therealong.

In the embodiment of FIG. 2, depression 11 is defined by three curvilinear lengths, and more precisely by a first circular arc 13 having a radius starting from the line which joins the extreme points 14 and 15 of the depression and by two further circular arcs 16, 17, each having a curvature opposite to that of the first circular arc 13, whose radii start at points 16', 17' as shown in FIG. 2. In this embodiment, the seam of the covering is located at point 18 along the depression profile.

In the embodiment of FIG. 3, the depression is still formed by three circular arcs, respectively indicated with reference numerals 19, 20 and 21, and the seaming area 18' is situated at the center of arc 19.

The embodiment of FIG. 3 differs from that of FIG. 2 in that the extreme points 22, 23 of the depression are spaced from the extreme points 24, 25 of the tooth top due to the presence of the flat lengths 26, 27. Practically, in this embodiment, the elastomeric material forming the tooth and the covering fabric are shaped so as to create a depression in a large part of the width of the tooth top but not in the totality of said width.

As can be seen in the embodiments of FIGS. 2 and 3, the two lines b and b', respectively tangent to the top and to the bottom of the depression in its lowest point, define two protuberances limited by the depression profile and by the upper portion of the contour of the belt sides. By virtue of these protuberances, the upper part of the belt tooth is deformable under bending stresses with respect to the remaining part; in this way, as will be more clearly explained hereinafter, in the presence of loads acting on the tooth, the end portions of the seam will tend to approach each other.

In some embodiments of the invention, the elastomeric material forming the tooth and the covering fabric are shaped so as to create a depression having a size which can be correlated with that of the remaining part of the tooth in accordance with the following ratios:

ratio a/A between the distance "a," measured between the extreme points of the depression, and the tooth base A, which ranges from 0.05 to 0.9 and preferably from 0.2 to 0.6, ratio h/H between the depth "h" of the depression and the tooth height H, which ranges from 0.05 to 0.7, with values equal to 1.0 in some cases and preferred values ranging between 0.13 and 0.3, ratio h/a, which ranges between 0.1 and 5 and preferably between 0.2 and 2, where:

h—is the depression maximum depth measured along the tooth central axis,

H—is the tooth height between the top points farthest from face 3 and base A,

A—is the tooth base measured between the intersections of tangents t and t' and the face 3: the tangents are traced at the points where the sides meet with the circle radiused to face 3, having a radius R.

Regarding the tooth sides whose upper parts represent one of the walls limiting the protuberances at the sides of the depression, the relative profiles may be of any kind; for instance, they may be rectilinear or even curvilinear, they may have circular arc shapes or an elliptical, hyperbolic or cubic shape, or may have exponents greater than 3.

Preferably, the sides are defined by parabolic arcs with vertices in the extreme points of the tooth top and with profiles determined by the following expression:

$$y = K x^2$$

where K varies from 0.70 to 1.64 when, according to an example:

$$A = 5.50 \text{ mm and } H = 3.5 \text{ mm}$$

More generically, for belts having a pitch p ranging between 2 and 20 mm or over, the value of K might range between 0.1 and 20 and preferably between 0.35 and 10.

Regarding the covering on the spaces and the teeth, it is possible to use a single rubberized fabric having, for instance, the features described in U.S. Pat. No. 3,621,727 or a double-layer fabric in which the warp and weft threads have the characteristics indicated in U.S. Pat. No. 3,937,094 or even an inextensible fabric as indicated in U.S. Pat. No. 4,514,719 in the name of UNIROYAL or any other fabric normally used to cover the teeth and the spaces between them in toothed belts.

Figure 4:
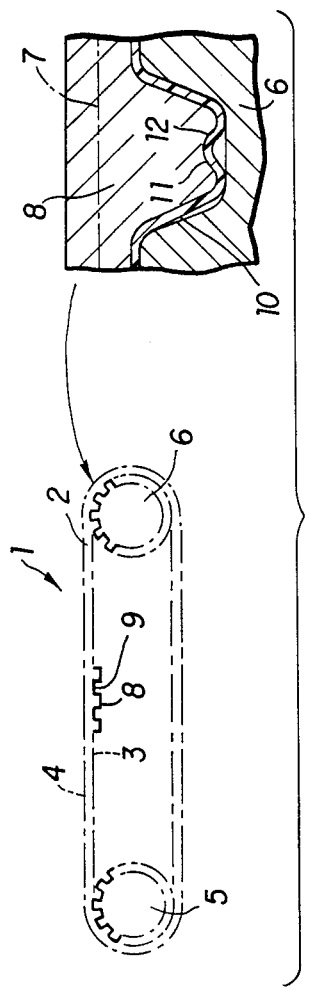
FIG. 4 illustrates a fabric arranged along the tooth profile.

Preferably, the fabric is a square woven fabric having warp and weft threads of polyamide 66 or of aramide or of any other equivalent material, in which the threads arrangement is schematically represented in FIG. 4 where reference numeral 30 indicates the weft threads positioned longitudinally with respect to the belt and reference numeral 31 indicates the warp threads intended to keep in right position the weft threads 30.

As can be seen from FIG. 4, both the warp and the weft threads are embedded in a rubber composition having a preestablished thickness "s."

Still preferably, with respect to the material commonly used for the covering fabrics and the shape of the elastomeric material forming the tooth top as well as that of the fabric, it has been found convenient to adopt a ratio between the fabric thickness "s" and the bending radius "r" of the curvilinear portion of the bottom which is in a range between 0.1 and 10 and preferably between 0.25 and 5.

For instance, in a toothed belt having sides with parabolic profile, a pitch p equal to 3 mm, a tooth height H=1.2 mm and a base A=1.95 mm, ratio s/r can be 2.5 in a first embodiment and 4.4 in a further embodiment. In the first embodiment, thickness "s" can be 0.4 mm and in the second embodiment 0.7 mm, with radius "r" being equal to 0.16 mm in both embodiments.

In a further embodiment of the toothed belt having a pitch p of 9.525 mm, a tooth height H of 3.35 mm and a tooth base A of 5.65 mm, ratio s/r is 0.26, with a fabric thickness "s" of 0.7 mm and a radius "r" of 2.73 mm.

Moreover, the covering, formed by one or more layers of fabric, can be either elastically extensible or inextensible.

A nylon fabric of extensible type is applied according to conventional techniques for manufacturing a toothed belt, i.e., it is at first wound up around the toothing of the mould and is then forced to expand by the pressure of the elastomeric material so as to be positioned along the mould toothing. The inextensible fabric is instead preliminarily positioned on the mould toothing to receive the elastomeric composition forming the belt teeth.

The present invention achieves the purposes for which it is intended.

In fact, the provision of the seam along the walls of the depression located on the tooth top obviates any contact between the seaming area and the surface of engagement with the pulley teeth. Consequently, the present invention eliminates all the disadvantages arising from the enlargement of the seam, which are present in conventional transmission systems.

Further, the main feature of this invention, i.e., preventing the seaming area from undergoing any rubbing action, affords the possibility of using this belt regardless of the profile of the pulley tooth, even if not exactly fitting to the belt tooth. In fact, possible interferences, even if relevant, between the side of the belt tooth containing the seam and the side of the pulley tooth, cannot have negative effects on a seam situated outside said contact area.

Moreover, in the present invention, the seam of the covering layer, even if obtained by superimposing the layer end portions, being internal to the tooth profile, cannot in any way cause disarrangement of the resistant insert, as occurs in conventional belts due to the presence of a serious discontinuity created by the seam on the top of a tooth in contact with the bottom of the pulley groove.

Figure 5:
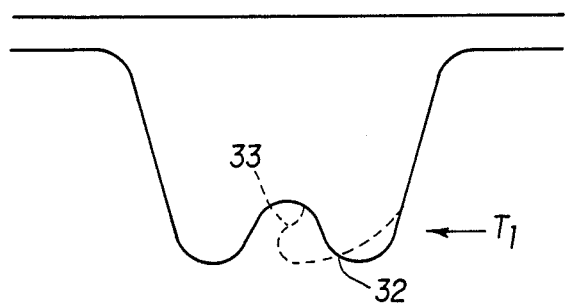
FIGS. 5-8 show the belt in various shapes illustrating the absence of stresses on the seam of the fabric arranged along the tooth profile.

In addition, in any load condition acting on the tooth containing the seam according to the invention, forces tending to open the end portions of the latter do not occur; on the contrary, forces are present which tend to cause said end portions to mutually approach. In fact, as can be seen from FIG. 5, the stresses T1, transmitted by the pulley tooth on the upper part of the belt tooth, tend to flex one protuberance with respect to the other. Therefore, region 32 of the protuberance will be subjected to tension and region 33 to compression.

Figure 6:
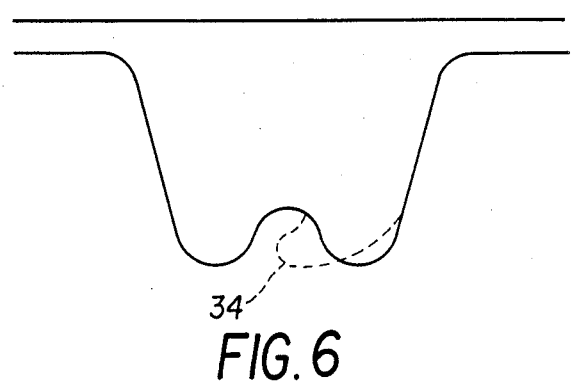

If seam 34 were positioned along wall 33 of the depression, as shown in FIG. 6, a tendency of the end portions of the fabric to mutually approach will occur, in consequence of the condition of compression of said wall. This effect, explained with reference to FIG. 6, will take place also when stresses T1 act on the other protuberance.

Figure 7:
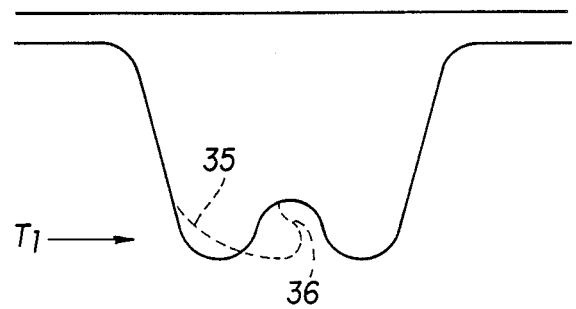

In fact, in this case, as shown in FIG. 7, the upper region 35 of the tooth side limiting the protuberance will be subjected to tension, while wall 36 of the depression, where the seam is supposed to be positioned, will be subjected to compression.

If the seam is positioned at the center of the depression, the end portions of the fabric will never be strongly stressed, since there will always be the condition of mutual approach of the two protuberances.

Figure 8:
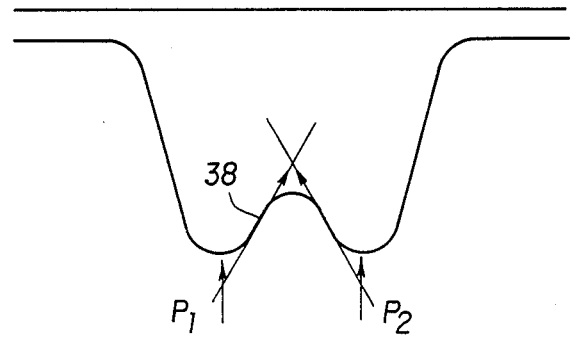
Figure 1:
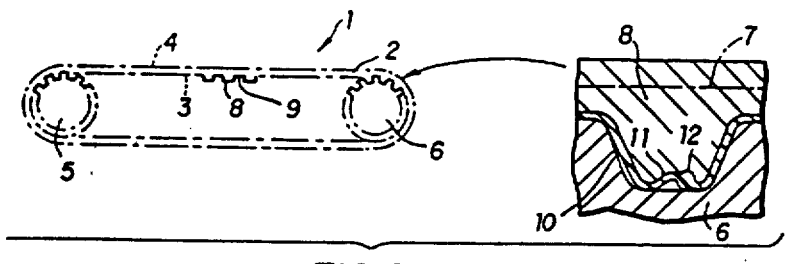
Figure 4:
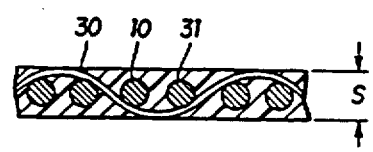
Figure 2:
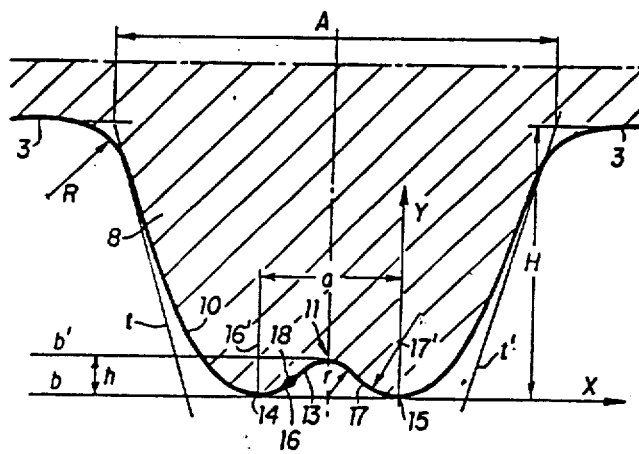
Figure 3:
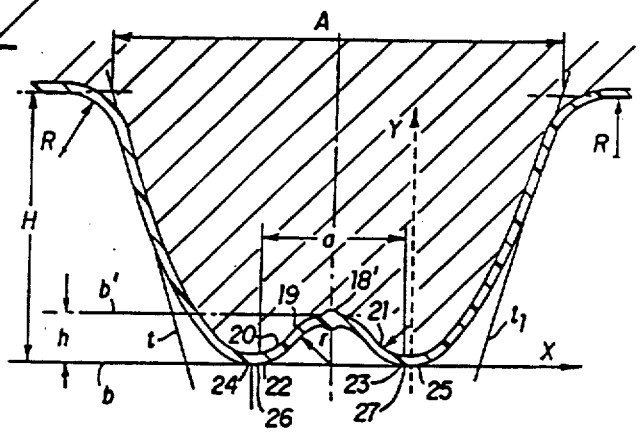

To complete the load conditions to which the tooth can be subjected, FIG. 8 represents schematically a further situation corresponding to the compression action exerted by the bottom of a pulley groove on the belt tooth when the height of the latter exceeds the depth of the pulley groove. As can be seen from FIG. 8, the components of forces P1 and P2 along the depression walls exert thrusts tending to mutually approach the end portions of seam 38 situated on either side of the depression.

Therefore, a particular characteristic of the present invention is represented by the fact that the seam of the covering layer, in any load condition, is subjected to compression, namely is in a state favorable to ensure, in course of time, a high reliability of the seaming area.

In particular, to achieve a long useful life of the belt, good results are obtained by the preferred embodiment of the invention characterized both by the geometry of the depression containing the seam, expressed by ratio h/a between the maximum depth and the maximum width of said depression, and by the dimensional characteristics of the fabric, correlated to the curvature of the depression bottom and expressed by ratio s/r between the fabric thickness and the bending radius of the bottom.

The very good results achieved by adopting the aboveindicated values for ratios h/a and s/r are quite surprising due to the involved phenomena which, inter alia, concern elastomeric materials and textile materials of different nature and also due to the influence exerted on them by the temperature conditions and by the environment in which the driving system will be operated.

Further, it must be taken into account that the same covering must comply with contrasting requirements, so that it is still more difficult to find an explanation as to the very good results obtained by adopting the ranges proposed above with respect to the indicated ratios.

In fact, as the elastomeric material forming the tooth and its covering layer are shaped to comprise a depression and as the seam joining the end portions of said layer is provided along said depression, any rubbing of the tooth on external surfaces and, consequently, any possible opening of the seam, which occurs in the conventional belts, can be prevented.

However, the flexion imparted to the fabric to fit it to the depression bottom, together with the deformability of the protuberances determined by the geometry of the depression, create innumerable bending cycles of the cords and/or of the weft threads forming the fabric and substantially of the whole layer having a thickness "s."

In practice, considering for the sake of simplicity a covering formed by a fabric layer formed only by longitudinally directed weft cords, the latter would be subjected to a cyclic bending stress and would tend to rotate about the hinge represented by the depression bottom defined by the preestablished radius "r."

In this condition, the smaller radius "r" is, the more dangerous will be the stress acting on the cords; therefore, for a given geometry of the depression, the solution might be a reduction in the transverse dimensions of the weft cords and in the overall thickness of the rubberized layer in order to prevent a fatigue deformation of the latter due to the aboveindicated innumerable bending cycles.

On the other hand, the weft cords have, inter alia, the function of increasing the belt driving power, so that a reduction in the cord size and in the overall thickness of the layer to withstand the greater deformability of the tooth top would be in contrast with an appropriate sizing of the fabric to reinforce it against loading stresses.

However, as suggested above, in spite of these opposite requirements, the preferred embodiments of the invention comprising the above-indicated ratios yield an increase in the useful life of the belt.

Moreover, when the covering is made of a double-layer fabric, the optimum conditions obtained with a single-layer fabric can be reached either by decreasing the thickness of the two layers or by shaping the elastomeric material forming the tooth and the covering layer applied on it such that the bottom of the depression is defined by a greater radius "r," with ratio h/a remaining unchanged.

Although some preferred embodiments of the present invention have been described above and illustrated in the drawings, it should be understood that the invention includes in its scope all modifications and alternative variations which are easily deducible from the present inventive idea.

For instance, the end portions of the covering layer can be butt-joined or superimposed and the material forming the belt can be formed of an elastomeric material as indicated for the belt described in U.S. Pat. No. 4,371,363, with the same tooth shape and size, or a polyurethane or other viscous-elastomeric material commonly used in toothed belts.

Further, the fabrics can have the features and the values described in this specification or can be other fabrics already applied to conventional toothed belts, in particular and inter alia, a nylon fabric, of the type commonly called "twill," in which the weft threads are braided differently from the warp threads, having a weight of 280 gr/m² (grams/square meter) and a thickness of 0.7 mm.

The belt according to the present invention also alternatively might have only one tooth, the top of which comprises a depression containing the seam of the covering layer, or might be such that all of the teeth and their covering might be shaped with equal or different depressions. If the covering is formed by several layers, the seam of the innermost fabrics might be positioned at any point along the belt, provided that, whatever solution is adopted, the seaming area of the outermost fabric is positioned along the depression of the top of one tooth.

What is claimed is:

1. A toothed belt formed of an elastomeric material or the like and delimited by two faces, said belt comprising:
    a plurality of inextensible inserts arranged side-by-side along a predetermined plane between said two faces,
    a plurality of teeth with spaces formed between adjacent teeth, said teeth being cantilevered from at least one of said faces, each of said teeth being limited by two sides, a top and two arcs radiused between said two sides and a base of the tooth located at said at least one of said faces,
    at least one layer of textile material covering the teeth and the spaces, said textile material having end portions joined together to form a seam, at least one depression being defined by a top of at least one of said teeth and said layer of fabric, said depression being laterally limited by protuberances having external surfaces following the contour of said at least one of said teeth, said seam being located along said depression, the position of said seam obviating any rubbing contact between said seam and a surface external to the belt, said seam being protected against forces acting from the outside on the belt sides due to deformation by flexion of each protuberance corresponding to a state of compression along the profile of said depression.

2. A toothed belt as in claim 1, wherein said depression comprises a curvilinear bottom portion, said seam being located at said curvilinear bottom portion.

3. A toothed belt as in claim 1 or 2, wherein said depression is defined by three adjacent curvilinear portions, respectively forming its bottom and its lateral walls.

4. A belt as in claim 3, wherein said depression is symmetrical with respect to a central axis of said at least one of said teeth.

5. A belt as in claim 3, wherein said three curvilinear portions comprise circular arcs, the curvature of the bottom curvilinear portion being opposite to that of the lateral walls.

6. A toothed belt as in claim 1, wherein said depression comprises a curvilinear bottom portion, said curvilinear bottom portion having a curvature with a predetermined radius of curvature "r" and a ratio h/a between a maximum depth and a maximum width of said depression in a range of 0.1 to 5, wherein "a" is the maximum width measured at the top of said at least one of said teeth between the two extreme lateral points of said depression in a direction parallel to said two faces of said belt and "h" is the maximum depth measured between a line joining said extreme lateral points of said depression and an innermost point of said depression in the direction of the axis of said at least one of said teeth.

7. A belt as in claim 6, wherein said ratio h/a is in a range of 0.20 to 2.

8. A belt as in claim 6, wherein a ratio s/r is in a range of 0.1 to 10, wherein "s" is a thickness of said layer of textile material positioned in said depression.

9. A belt as in claim 8, wherein said ratio s/r is in a range of 0.25 to 5.

10. A belt as in claim 9, wherein said ratio a/A is in a range of 0.2 to 0.6.

11. A toothed belt as in claim 10, wherein ratio h/H is in a range of 0.13 to 0.3.

12. A belt as in claim 1, wherein a ratio between a depth "h" of said depression and a height "H" of said at least one of said teeth is in a range of 0.05 to 0.7.

13. A belt as in claim 1, wherein a ratio a/A is in a range of 0.05 and 0.9, wherein "a" represents a maximum width of said depression and "A" is a tooth base defined by intersections of tangents to sides of said at least one of said teeth at points where said sides meet with the radiusing circles.

14. A belt as in claim 1, wherein said protuberances are limited, externally to said depression, by profiles having shapes of parabolic arcs having vertices on extreme points of the top of said at least one of said teeth, said profiles extending along both entire sides of said at least one of said teeth as far as radiusing circles of said at least one of said teeth, and said parabolic arcs being defined by an expression $$y = Kx^2$$

where K is in a range of 0.1 and 20.

15. A toothed belt as in claim 1 wherein said seam is formed by butt-joining end portions of said fabric.

16. A belt as in claim 1 wherein said seam is formed by superimposing end portions of said fabric.

17. A belt as in claim 1 wherein said seam is situated in the center of said depression.

18. A belt as in claim 1, wherein said depression is formed of two rubberized layers superimposed to each other, said seam being formed at the outermost one of said rubberized layers and being situated along said depression.

19. A synchronous transmission system, comprising:
  a plurality of inextensible inserts arranged side-by-side along a predetermined plane between said two faces,
  a plurality of teeth with spaces formed between adjacent teeth, said teeth being cantilevered from at least one of said faces, each of said teeth being limited by two sides, a top and by two arcs radiused between said two sides and a base of the tooth located at said at least one of said faces,
  at least one layer of textile material covering the teeth and the spaces, said textile material having end portions joined together, at least one depression being defined by a top of at least one of said teeth and said layer of fabric,
  said depression being laterally limited by protuberances having external surfaces following the contour of said at least one of said teeth, end portions of the fabric layer forming a seam located along said depression, the position of said seam obviating any rubbing contact between said seam and a surface external to the belt, said seam being protected against forces acting from the outside on the belt sides due to deformation by flexion of each protuberance corresponding to a state of compression along the profile of said depression, and
  at least two pulleys each provided with a plurality of teeth alternating with grooves to mate with the teeth of said belt, each of said protuberances responsive, to said at least one of said teeth entering a pulley groove, being deformed by flexion by a side of said pulley groove.

20. A transmission system as in claim 19, wherein a height of said at least one of said teeth comprising said depression is greater than the depth of said pulley groove, said seam being forced to close upon itself by compression forces acting along sides of said depression.

* * * * *

UNITED STATES PATENT AND TRADEMARK OFFICE
CERTIFICATE OF CORRECTION

PATENT NO. : 4,850,943

DATED : July 25, 1989

INVENTOR(S) : Tommaso Di Giacomo et al

It is certified that error appears in the above-identified patent and that said Letters Patent is hereby corrected as shown below:

The sheet of drawing consisting of figures 1-4 should be deleted to appear as per attached sheet.

Signed and Sealed this

Second Day of July, 1991

Attest:

HARRY F. MANBECK, JR.

Attesting Officer

Commissioner of Patents and Trademarks